United States Patent
Jiang et al.

(10) Patent No.: US 7,662,318 B2
(45) Date of Patent: Feb. 16, 2010

(54) METHOD FOR POST-INJECTION IN MOLD LAMINATION WITH AN ADHESIVELY COATED FUNCTIONALIZED FILM

(75) Inventors: Peiqi Jiang, Tarpon Springs, FL (US);
Bruce Keegan, Seminole, FL (US);
Steven Weber, Clearwater, FL (US)

(73) Assignee: Essilor International (Compagnie Generale d'Optique), Charenton, Cedex (FR)

( * ) Notice: Subject to any disclaimer, the term of this patent is extended or adjusted under 35 U.S.C. 154(b) by 0 days.

(21) Appl. No.: 12/152,509

(22) Filed: May 14, 2008

(65) Prior Publication Data

US 2009/0283924 A1     Nov. 19, 2009

(51) Int. Cl.
*B29D 11/00*     (2006.01)

(52) U.S. Cl. ............... 264/1.7; 264/1.32; 264/2.7; 264/1.31

(58) Field of Classification Search ............... 264/1.7, 264/1.31–1.32, 2.7, 247; 156/245
See application file for complete search history.

(56) References Cited

U.S. PATENT DOCUMENTS

| | | | |
|---|---|---|---|
| 5,827,614 | A | 10/1998 | Bhalakia et al. |
| 6,328,446 | B1 | 12/2001 | Bhalakia et al. |
| 6,659,608 | B2 | 12/2003 | Yamamoto et al. |
| 6,814,896 | B2 | 11/2004 | Bhalakia et al. |
| 2007/0195422 | A1 | 8/2007 | Begon et al. |

*Primary Examiner*—Kat Wyrozebski
*Assistant Examiner*—Xue Liu
(74) *Attorney, Agent, or Firm*—Keusey & Associates, P.C.

(57) ABSTRACT

A method for laminating a functional film on to a plastic injection molded lens. An outer layer of the film is selected to perform an HMA-type function when subjected to the heat and pressure of the mold. After forming the lens, the mold is open and the film is loaded in to the empty insert. The residual heat and pressure bonds the film via the HMA to the lens, in a press lamination process. A functionally enhanced lens having a film intimately laminated on to one side.

26 Claims, 2 Drawing Sheets

METHOD FOR POST-INJECTION IN MOLD LAMINATION WITH AN ADHESIVELY COATED FUNCTIONALIZED FILM

BACKGROUND OF THE INVENTION

1. Field of the Invention

The invention relates to laminating a functional film onto an injection molded ophthalmic lens using the clamp pressure and residual resin heat to bond a surface of the film according to a hot melt adhesive (HMA) function.

2. The Prior Art

In the manufacture of plastic lenses, the injection molded lens is removed from the mold for further processing. Typically the lenses are cleaned and dip-coated with a tint coating, photochromic coating, anti-reflective coating, hard coating or other protective coating layers. The cleaning and dip-coating process requires a large investment of space, resources and energy.

Other approaches involve laminating a single or multi-layer film onto the lens. One technique known as film insert molding (FIM) places the film into the empty cavity of the injection molding machine. The molten resin is then injection molded into the cavity so that the high temperature melts the facing layer of the film, causing it to fuse to the subsequently solidified lens. By way of example, this technique is described in U.S. Pat. Nos. 5,827,614, 6,328,446, 6,814,896 and 6,659,608. A serious drawback of FIM, is the requirement that the facing layer of the film be the same or compatible with the lens resin to obtain a fusion between the material of the facing layer of the film and the injected resin. Another drawback of FIM, is related to the high temperature required to obtain melted resin which could degrade or partially destroy the functionality built into the film.

Another technique to make a polarized lens uses thermal glue to adhere the film or films on to the lens. Typically a liquid glue is applied to the lens or film, while the lens is still in the mold. This approach is technically challenging because the amount of glue needs to be carefully controlled based on its viscosity and other rheological properties. Several factors can affect the thickness and the resulting optical quality. The glue can also run out and contaminate the removable inserts of the molding machine. One attempt to cure these problems, proposes to use a pressure sensitive adhesive (PSA) on the film. The PSA is relatively soft even after lamination, and may reduce the overall durability of the completed lens. By way for example this technique is described in U.S. patent application Ser. No. 2007/0195422.

Accordingly, it would be desirable to provide a simplified process for adding functional layers to a lens.

SUMMARY OF THE INVENTION

It is an object of the present invention to provide an in-mold lamination system that easily combines a functional film with a lens.

It is a further object of the present invention to utilize the clamp force of an injection molding machine to mechanically press a functional film onto an injection molded lens.

It is another object to take advantage of the residual heat of a just molded lens, to promote adhesion of an HMA-layer which is pre-coated on a film.

It is an additional object to provide a solid, dry HMA-type layer on the film with a controllable thickness.

It is an additional object to broaden the range of film materials that can be laminated.

These and other objects according to the invention are achieved by an embodiment of the invention involving a method for laminating a functional film onto an injection molded thermoplastic lens that resides in an injection molding machine. Another aspect of the invention is a thermoplastic ophthalmic lens with a laminated functional film manufactured by the process. In a first step of the process, molten thermoplastic resin is injected into a lens-forming cavity held closed under a primary clamp force. The mold is opened at a time when the lens is rigid enough to retain its shape and separate from one of the inserts. A functional film having a dry lens-contacting surface is loaded into the separated insert or applied directly onto the lens. The mold is closed to a secondary clamp force less than the primary clamp force so that the diminishing residual heat of the lens and the pressure causes the lens-contacting surface of the film to be intimately bonded to the lens.

The thermoplastic resin is injected at a melt temperature $T_m$ that is significantly above its glass transition $T_g$ temperature, and the lens forming cavity is at a temperature lower than $T_g$ to facilitate solidification. The $T_g$ is in the range of 500 degrees F. to 600 degrees F. and the mold temperature is in the range of 200 degrees F. to 295 degrees F., when the lens forming resin is polycarbonate.

The film includes a polarized film and an outer protective layer covering the polarized film. The film comprises a polarized film sandwiched between an outer and an inner protective layer. The inner protective layer is made from a polymer and includes the lens-contacting surface. The polymer functions as a hot melt adhesive layer to intimately bond the film to the lens. The outer and inner protective layers are both made from a thermoplastic material, for example, polycarbonate (PC), cellulose triacetate (TAC), cellulose acetate butyrate (CAB) or polyethylene terephthalate (PET). One of the protective layers includes an additional functional feature.

Prior to the loading step, the method further includes the step of applying a uniformly thin layer of hot melt adhesive (HMA) on to the inner protective layer. The HMA may be applied as a liquid layer or a formed solid layer. For liquid application, the HMA may be spin coated onto the film. The spin coated HMA is dried to form the lens-contacting surface. Optionally, an optical dye, a cosmetic dye, a tinting dye or a photochromic dye is added to the liquid coating. The thickness of HMA layer is between 1 micron to 100 micron. In a non-limiting example, the HMA may include polyurethane based materials, crosslinkable polyurethane materials, poly(oxazoline), poly(vinylpyrolidone/vinyl acetate), acrylic/styrenic copolymer emulsion, and polyvinyl resin with hydroxyl, carboxyl functionality. The HMA is tacky free at room temperature (20° C.) and is tacky at a temperature between 50° C. to 130° C. The closing step comprises tackifying the dry HMA by heating the dry HMA to a temperature in the range of 248 degrees F. to 284 degrees F. for a period of time between 1 minute and 2 minutes until the HMA sets.

The closing step also includes thermoforming the film to replicate the shape of the lens. The secondary clamp force is in the range from about 1% to about 50% of the primary clamp force. Following the closing step, the method further including the step of ejecting the lens from the mold after the HMA has set and the laminated lens is capable of withstanding ejection forces without deforming. In a non-limiting example, the thermoplastic resin may include polymethyl (meth)acrylate, polycarbonate, polycarbonate/polyester blends, polyamide, polyester, cyclic olefin copolymers, polyurethane, polysulfone and combinations thereof. Lenses made from polycarbonate are well suited to the laminating process according to the invention. The lens-forming cavity may be an afocal lens forming cavity, a unifocal lens forming cavity, a bifocal lens forming cavity, a trifocal lens forming cavity, and a progressive lens forming cavity.

BRIEF DESCRIPTION OF THE DRAWINGS

The advantages, nature, and various additional features of the invention will appear more fully upon consideration of the illustrative embodiments now to be described in detail in connection with accompanying drawings. In the drawings wherein like reference numerals denote similar components throughout the views.

DETAILED DESCRIPTION OF THE PREFERRED EMBODIMENT

As an overview of the method according to the invention, an optical lens is formed by the conventional manufacturing cycle of injecting molten plastic into a mold cavity that is at a temperature lower than the glass transition temperature $T_g$ of the plastic, which is about 300 degrees F. for polycarbonate. The mold is opened after the lens is sufficiently solidified to expose one lens surface. The lens is retained on one insert side with the other insert side being empty. A film is loaded into the empty insert or placed directly onto the lens surface. The film is prepared ahead of time. The functional film may be a simple unilayer, or a laminated or stratified film comprising a plurality of layers having identical or different chemical characteristics and/or functionalities. The preparation of the functional film consists of coating an HMA-layer onto one face of the functional film, and more particularly onto the face which will be put in contact with the lens during the following steps of the process. In one embodiment of the invention it is possible that an outer-layer of the functional film may be made of a polymer that provides an HMA-type function. When needed an HMA may also be coated on to one face of the film. Either way, an HMA or HMA-type layer is provided. When the film is loaded in to the empty insert or directly applied onto the lens, the HMA-type layer is arranged to face the lens. The mold closes again, bringing the film and lens in to contact with each other. The film is laminated to the lens under heat and pressure which is maintained for a predetermined period of time. During this predetermined time period, the HMA-type layer may become tacky without loosing dimensionally stability. That is, the thickness of the HMA-type layer does not change. The film is thermoformed to replicate the shape of the surface of the lens. As the residual heat of the lens diminished, the HMA-type layer returns to its solid state, having now intimately bonded to the lens. The functionally enhanced lens is removed and may undergo conventional processing, i.e. cut/generated, fined, polished, or coated.

Figure 1:
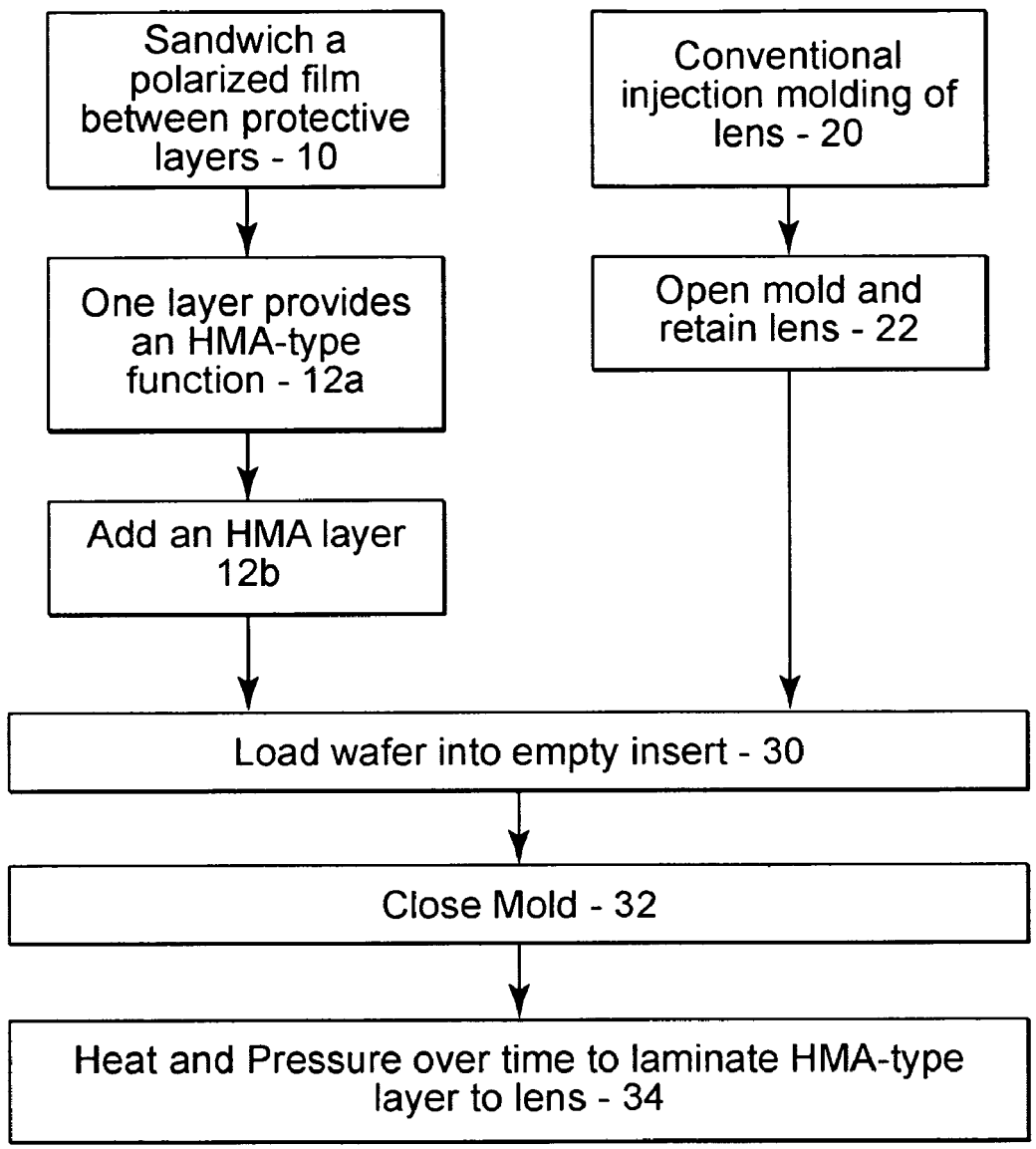
FIG. 1 is a flowchart showing various steps in the method according to an embodiment of the invention.

Referring now in detail to the Figures, and in particular FIG. 1, there is shown a flowchart showing various steps according to the inventive method. Steps 10, 12a and 12b may be performed in advance so that an inventory of films is ready to be laminated. In step 10 a functional film is provided by sandwiching a film between two protective layers. Typical functional film as described below could be polarized film which comprised usually a PVA (polyvinyl acetate) film sandwiched between two identical layers of polycarbonate (PC), or cellulose triacetate (TAC) or cellulose acetate butyrate (CAB) or polyethylene terephthalate (PET). As noted in step 12a, one of the layers may be made of a polymer that provides a HMA-type function. A liquid HMA solution may be applied to one of the protective layers and dried to form a solid HMA layer. In either case, we define an HMA-type layer or an HMA layer as one having the following properties.

By "hot-melt adhesive", it is intended to mean a room temperature solid but flexible adhesive, which melts or drops in viscosity upon heating, and rapidly sets with cooling to create a bond. Preferably, the HMA used in the present invention will not be flowable even after heating in the mold because it is applied under strict conditions. The thickness of the adhesive layer in the final lens will typically be between 1 µm to 100 microns.

HMAs can be repeatedly softened by heat and hardened or set by cooling (thermoplastic HMAs), except for reactive HMAs, which are applied like conventional HMAs but cross-link forming permanent, non-remelting bonds. Additives such as siloxanes or water can be used to form the cross-linked bonds. An important property of HMAs is the ability to solidify or congeal or "set" very rapidly under normal ambient conditions, preferably almost instantaneously, when cooling down from the application temperature. They are available in dry form, or in solvent and latex based forms. The dry and unflowable layers according to the invention may be formed by evenly applying a liquid form on either a geometrically defined surface of the lens substrate or a functional coating. Thereafter, the deposited liquid latex layer is dried to an unflowable state by heating. Usually, heating will be performed at a temperature ranging from 40° C. to 130° C. When a dry form is used, it is heated to the temperature where it will flow readily, and then it is applied to either a geometrically defined surface of the lens substrate or a functional coating.

Applied heat preferably ranges from 50 to 120° C. ("tacky temperature"). Heating condition and time are very important to obtain a good adhesion in the case of HMAs. As is known in the art, if a polymer or polymer blend does not have the properties of an HMA per se within the meaning of these terms as used herein, it can function as an HMA by admixture with small quantities of additives. In some embodiments, the transparent adhesive composition of the invention may comprise, apart from the polymer material, tackifiers, preferably tackifier resins, plasticizers, diluents, waxes, liquid oils and various other components for adjusting the tack, rheological characteristics (including viscosity, thixotropy, and the like), adhesive bond strength characteristics, rate of "set", low temperature flexibility, color, odor, etc. Such plasticizers or tackifying agents are preferably compatible with the blend of polymers, and include: aliphatic hydrocarbons, mixed aliphatic and aromatic hydrocarbons, aromatic hydrocarbons, hydrogenated esters and polyterpenes.

In a preferred embodiment, the transparent adhesive composition may also include an effective amount of a coupling agent (as defined hereinafter) in order to promote its adhesion with the geometrically defined surface of the lens substrate and/or the functional coating to be laminated. The transparent adhesive composition may also comprise a classical dye or a photochromic dye.

One practical embodiment of the method, includes providing an HMA dissolved in a solvent, which could be water to form a liquid. The liquid is spin coated on to an external layer of the film. The film and applied liquid HMA are heated to drive off the solvent. The resulting film has a very thin layer of HMA, coating its entire surface, and being of uniform thickness throughout.

In step 20, the mold is closed at a primary clamp force to begin the injection molding cycle. The mold consists of one or more pairs of lens forming inserts which collectively define a cavity when the mold is closed. For example, for molding polycarbonate with a 4-cavity mold, the primary clamp force is typically greater than 75 tons, preferably greater than 100 tons. The thermoplastic resin is rendered molten in a screw injector barrel. When using polycarbonate, for example, the melt temperature $T_m$ may be in the range of 500 to 600 degrees F. In step 12 the molten resin is injected into the cavity. The inserts may be maintained at a temperature in the range of 200 to 295 degrees F. The cooler temperature of the inserts facilitates solidification of the molten resin as its temperature drops below its $T_g$. Optionally, a packing pressure may be applied, where the actual pressure exerted on the thermoplastic is higher than 1,000 psi. A wait time is imposed to insure dimensional stability, before the mold is opened in step 22. The wait time may be in the range of 30 seconds to several minutes, typically from 30 seconds to 5 minutes. These steps 20 and 22 are part of a conventional injection molding cycle.

The lens will be retained on one side of the mold. As will be apparent from the following description, the lens may be retained either on the stationary or the movable side of the mold. In addition, the exposed lens surface may be either the convex or the concave side. At this stage, the lens is in the process of cooling from its $T_g$ of 500-600 degrees F. down to the mold temperature of 200-300 degrees F.

Next the functional film is brought into the mold. Step 30 indicates the film is inserted into the empty mold cavity. The lens may be retained on the stationary or movable side of the mold. In 30, the film may be inserted into the empty mold cavity that contains a convex or concave insert. The film has its HMA-type layer facing the lens.

In step 32 the mold is again closed at a secondary clamp force which is less than the primary clamp force used during the injection molding phase. As the mold closes, the previously empty mold insert presses the film down on to the lens. The residual heat from the lens is absorbed by the HMA-type layer as the mold clamps down. The film is thermoformed to replicate the shape of the surface of the lens. The heat and pressure are maintained for a predetermined period of time to complete the lamination process. The HMA-type layer may become slightly tacky on the lens side, which allows it to adhere to the lens surface.

The secondary clamp force may rise to a fraction of the primary clamp force. For example, the secondary clamp force may reach between 1% and 50% of the primary clamp force. For example, if the primary is greater than 75 tons, the secondary would be between 0.75 ton and 37.5 tons. If the primary is greater than 100 tons, the secondary would be between 1 ton and 50 tons. The mold may be held closed at the secondary clamp force for a period designated as dwell time, for example, for less than one minute up to several minutes. In any event, the mold is held closed until the temperature drops to a point where the HMA-type layer is again solid and the film is intimately bonded to the lens. A further requirement is that the film will not delaminate when the mold is opened, and the laminated lens is removed. At this point the molding, thermoforming, laminating cycle is complete. The completely empty mold, is ready to be closed and begin the next cycle, starting with injection molding a thermoplastic lens. An example of the inventive method will now be described.

EXAMPLE 1

A liquid HMA coating vas prepared by combining 0.4 g of DSM CX-100 polyfunctional aziridine crosslinker to 20.0 g of Dow AW 875 waterborne vinyl resin dispersion and mixing. The resulting mixture as HMA solution was spin coated onto the concave side of a 5.5 base PC polarized film (PC/PVA/PC) from MGC Co in the spin conditions of 50 rpm 2 sec., then 1000 rpm, 8 sec. After drying at room temperature (~20° C.) for less than 5 minutes, the film was placed in a 60° C. oven or 30 minutes to get a HMA coated polarized PC film. The thickness of the HMA layer is about 5-6 microns across the entire film surface.

Post injection in-mold lamination experiments were conducted using an Engel ES700H 150 US ton vertical injection molding machine equipped with a 2-cavity side-entry mold.

The experiments were conducted according to the steps mentioned above. First, two 5.50-base SFSV (semi-finished single vision) PC lenses, 76 mm in diameter and 9 mm in thickness, were injected using the following process parameters. The melt temperature $T_m$ was 510 degrees F. in the screw injector. The mold temperature was 260 degrees F. The shot size was 2.50 inches, and the injection speed was 0.1 inch/s. The packing pressure had a machine specific reading of 800 psi, which was estimated to deliver an actual packing pressure of 9,000 psi onto the molten resin. The cooling time was 4 minutes.

At the end of cooling, the mold was opened to expose the convex surfaces of the molded lenses. Then, the concave side of the coated film was placed on the convex side of the freshly molded SF (Semi-finished) PC lens (5.5 base) which was still hot in the mold, and the convex mold was closed for 1 minute, with a clamping pressure of 7 tons and a mold temperature of 140° C.

After removal from the mold, the coated HMA film had bonded to the lens very well. The resulting polarized lens was transparent with very good polarization. Upon visual inspection, no voids were seen in the HMA layer. The polarized lens was then cut/generated and fined and polished through a classic Rx process to get a prescription lens. Surprisingly, there was no sign of de-lamination during any of these steps. The adhesion between lens and the film is excellent, even after a strong shock on edge of the lens.

EXAMPLE 2

The test from Example 1 was repeated on a PC progressive (PAL) SF lens surface (5.5 base) with 2.5 adding power. The polarized film was aligned with PAL lens design before lamination. The result was as good as Example 1 of SV SF lens. A PAL engraving mark was shown on the laminated lens. This example demonstates the effective thermoforming of the film to the shape of the target lens surface. One film may be thermoformed onto lenses having different add powers and different base curves. Typically, the film base should be equal or lower than the lens base. For PAL lens, the film base should be lower than the high add base side.

Example 3-8 are shown in Table 1. Examples 3,4 and 6-8 use various other forms of HMA formulations that are dissolved in the solvent or solvent blends listed. Example 5 uses a polycarbonate layer (PC) to function as an HMA-type layer. The PC layer utilizes in-molding lamination conditions which are in the range of those used for the other HMAs. The PC undergoes a heating and cooling cycle which causes it to bond to the lens. We refer to this as performing an HMA-type function because it is similar process as when the HMA becomes tacky and then sets. In addition, the PC has good cosmetics and fair adhesion, on par with examples 6 and 7 which utilize HMA formulations.

TABLE 1

| Examples | Ex. 3 | Ex. 4 | Ex. 5 | Ex. 6 | Ex. 7 | Ex. 8 |
|---|---|---|---|---|---|---|
| HMA formulations | Aquazo-200 (20% solid) | Aquazo-500 (20% solid) | PC layer only | Joncryl1532 | PVP/VA | 81% AW-875 + 4% CX-100 + 15% DI water, Mixed on stir plate for 1 min. |
| Solvent | MEK/IPA/MeOH | MeOH | — | H2O | MeOH/H2O | H2O |
| HMA coating process | Spin/RT dry/60 C. @ 24 min | Spin/RT dry/60 C. @ 24 min | — | Spin/RT dry/60 C. @ 24 min | Spin/RT dry/60 C. @ 24 min | Spin coat 3 ml solution 500 rpm @ 2 s spin off 1000 rpm @ 8 s then 60° C./30 min |
| Film Base | 5.5 base | 5.5 base | 5.5 base | 5.5 base | 5.5 base | 5.5 base |
| In-molding lamination condition | 120-140 C., 1-2 min | 140/1-2 min | 140 C./2 min | 120 C., 1-2 min | 140/1-2 min | 140° C., 6-7 ton, 2 min |
| Cosmetics | Good | Good | Good | Good | Good | Good |
| Adhesion | Very Good | Very Good | Fair | Fair | Fair | Very Good |
| Optics/polarization | Good | Good | Good | Good | Good | Good |

Example 9-12 shown in Table 2 are similar to the Example 2 except different HMA formulations and different HMA drying conditions were used with different polarized films.

TABLE 2

| | Examples | | | |
|---|---|---|---|---|
| | Ex. 9 | Ex. 10 | Ex. 11 | Ex. 12 |
| HMA formulations | 99.90% Dispercoll U42 + 0.1% L-7608, Mixed on stir plate for 5 min. | 99.90% Dispercoll U42 + 0.1% L-7608, Mixed on stir plate for 5 min. | 99.80% Dispercol UVPK 8758 + 0.2% L-7608, Mixed on stir plate for 5 min. | 49.90% Dispercoll U42 + 49.90% Dispercol UVPK 8758 + 0.2% L-7608, Mixed on stir plate for 5 min. |
| Solvent | Water | Water | Water | Water |
| HMA coating process | Spin coat 3 ml solution 500 rpm @ 2 s spin off 1000 rpm @ 8 s. | Spin coat 3 ml solution 500 rpm @ 2 s spin off 1000 rpm @ 8 s. | Spin coat 3-6 ml solution 450 rpm @ 1 s, spread 800 rpm @ 5 s, spin off 1200 rpm @ 3 s. | Spin coat 3-6 ml solution 450 rpm @ 1 s, spread 800 rpm @ 5 s, spin off 1200 rpm @ 2 s. |
| HMA layer dry condition | 60° C./10 min | 60° C./10 min | IR cure 110° C. @ 1 min. | IR cure 110° C. @ 1 min. |
| Film type | PC/PVA/PC | TAC/PVA/TAC | PC/PVA/PC | PC/PVA/PC |
| In-molding lamination conditions | 140° C., 3-7 ton, 2 min | 140° C., 3-7 ton, 2 min | 140° C., 3-7 ton, 2 min | 140° C., 3-7 ton, 2 min |
| Adhesion | Very good | Very good | Very good | Very good |
| Optics/polarization | Very good | Very good | Very good | Very good |
| PAL Engraving Mark | Seen | Seen | Seen | Seen |

Table 3 shows the some key monomers used in these examples.

TABLE 3

| Product | Manufacturer | Chemical Family |
|---|---|---|
| Dispercoll U42 | Bayer Material Science | high mol. Wt. polyurethane |
| Dispercoll U KA 8758 | Bayer Material Science | high mol. Wt. polyurethane |
| AW-875 | Dow Chemical Co. | solution polymerized vinyl resin with hydroxyl, carboxyl functionality |
| PVP/VA | ISP Chem. Co. | poly(vinylpyrolidone/vinyl acetate) |

TABLE 3-continued

| Product | Manufacturer | Chemical Family |
|---|---|---|
| Aquazol 200 | ISP Chem. Co. | poly(oxazoline) |
| Joncryl 1532 | BASF Chem. Co. | acrylic/styrenic copolymer emulsion |

Various HMA formulations in addition to those shown here may be used within the spirit and scope of the invention. The main requirement is to provide an HMA layer that can be applied in a thin even layer, that will remain solid. When heated to less than 150 degrees F., the HMA should be capable adhering to a plastic lens, and then rapidly set as the temperature drops. Other HMA formulations could be used in the methods of the invention, for example:

1) HMA made from polyurethane based materials, poly(oxazoline), poly(vinylpyrolidone/vinyl acetate); acrylic/styrenic copolymer emulsion, and polyvinyl resin with hydroxyl, carboxyl functionality.

2) HMA made from crosslinkable polyurethane materials; poly(oxazoline), poly(vinylpyrolidone/vinyl acetate); acrylic/styrenic copolymer emulsion; polyvinyl resin with hydroxyl, carboxyl functionality.

3) HMAs that are tacky free in room temperature and Tacky when the temperature is between 50C to 130C.

Figure 2:
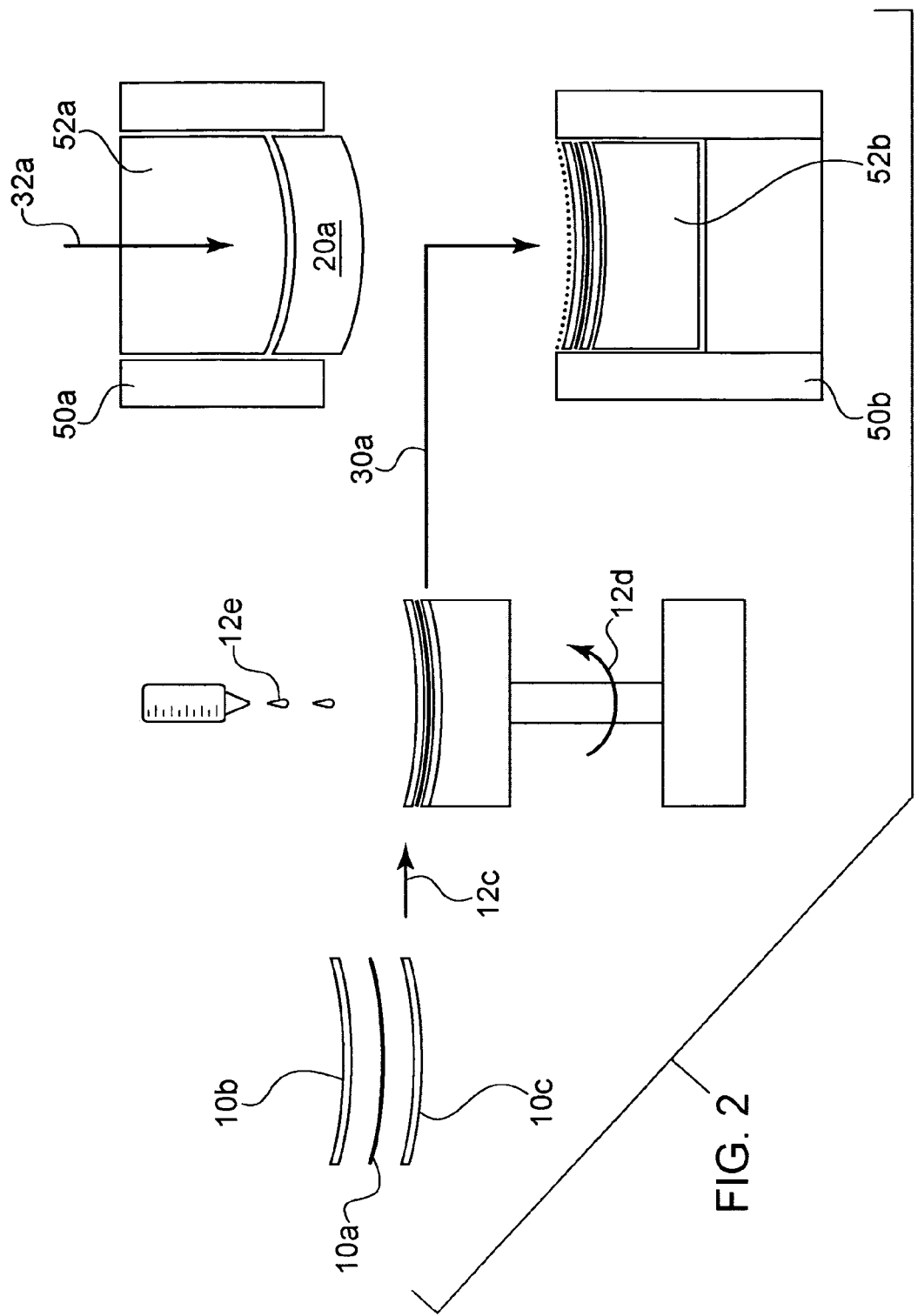
FIG. 2 is a schematic diagram illustrating a work piece flow according to an embodiment of the invention.

FIG. 2 is a schematic diagram of an exemplary material processing flow that may be used to practice the laminating method according to the invention. A film 10a is sandwiched between two protective layers 10b and 10c. For example, film 10a may be a polarized film such as polyvinyl alcohol (PVA) polarizing film. Because the film is delicate it is typically encased within thermoplastic films. The films are very thin, optical quality lenses having zero or very low power that are formed by injection molding or thermoforming. They are made from material that is similar to that used to make plastic lenses.

To add the HMA layer the film is transferred 12c to a spin coater. The film may be transferred manually. A preferred method may transfer the films robotically within a clean room environment to prevent dust from contaminating the surfaces. By operation of the spin coater 12d, a solution of HMA is applied 12e to one surface of the film. Spin coating causes the HMA solution to spread outwardly over the surface of the lens and is adjusted in combination with the viscosity of the solution to deliver a very thin layer over the entire surface, at uniform thinness.

The coated films may then be stored until needed. In a parallel process, thermoplastic lenses are injection molded in a machine 50a and 50b having lens forming inserts 52a, 52b. The types of thermoplastic used for injected lenses include polymethyl(meth)acrylate, polycarbonate, polycarbonate/polyester blends, polyamide, polyester, cyclic olefin copolymers, polyurethane, polysulfone and combinations thereof. Excellent results have been achieved with polycarbonate derivatives. Using the method of the invention it is possible to use a gated lens-forming cavity, which is one of an afocal lens forming cavity, a unifocal lens forming cavity, a bifocal lens forming cavity, a trifocal lens forming cavity, and a progressive lens forming cavity. As an example, the mold consists of a four cavity configuration, but could be any number of n-pairs, where n is between 1 and 5. The lenses are very hot, having been at 500-600 degrees F. when injected, and gradually cooling to the mold temperature of 200-300 degrees F.

One mold side, either 50a or 50b represents the stationary side of the mold. For the present application the lens 20a may be retained on either the movable or stationary side. The other side, designated arbitrarily as 50b will have an empty cavity half or empty insert. Coated films may subsequently be transferred 30a robotically and loaded into the empty cavity, where they will be placed against the insert. The mold will be closed under action of the clamp 32a.

After the film is laminated to one side of the lens, the laminated lens may be provided with a coating. Such coatings may include photochromic coatings, anti-fog coatings, anti-static coatings, anti-scratch coatings, protective coatings, anti-reflective coatings, clear coatings, cosmetically tinted coatings and anti-smudge coatings. The invention further covers thermoplastic ophthalmic lenses, laminated lenses, and functionally enhanced or modified lenses manufactured by the described methods, and as otherwise described herein. It is particularly useful to manufacture semi-finished (SF) polarized polycarbonate lenses or finished polarized polycarbonate lenses.

Having described preferred embodiments for lens manufacturing, materials used therein and methods for processing same (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for laminating a functional film onto an injection molded thermoplastic lens that resides in an injection molding machine, comprising the steps of:
    injecting molten thermoplastic resin into a lens-forming cavity of a mold held closed under a primary clamp force;
    opening the mold at a time when the lens is rigid enough to retain its shape and separate from an insert;
    loading a functional film having a dry lens-contacting surface into the separated insert or directly onto the lens; and
    closing the mold to a secondary clamp force less than the primary clamp force so that the diminishing residual heat of the lens and the pressure causes the lens-contacting surface of the film to be intimately bonded to the lens.

2. The method of claim 1, wherein the thermoplastic resin is injected at a melt temperature $T_m$ that is significantly above its glass transition $T_g$ temperature and the lens forming cavity is at a temperature lower than $T_g$ to facilitate solidification.

3. The method of claim 2, wherein the $T_g$ is in the range of 500 degrees F. to 600 degrees F. and the mold temperature is in the range of 200 degrees F. to 295 degrees F., when the lens forming resin is polycarbonate.

4. The method of claim 1, wherein the film includes a polarized film.

5. The method of claim 4, wherein the film includes an outer protective layer covering the polarized film.

6. The method of claim 1, wherein the film comprises a polarized film sandwiched between an outer and an inner protective layer.

7. The method of claim 6, wherein the inner protective layer is made from a polymer and includes the lens-contacting surface.

8. The method of claim 6, wherein the polymer functions as a hot melt adhesive layer to intimately bond the film to the lens.

9. The method of claim 6, wherein the outer and inner protective layers are both made from a thermoplastic material selected from the group consisting of polycarbonate (PC), cellulose triacetate (TAC), cellulose acetate butyrate (CAB), and polyethylene terephthalate (PET).

10. The method of claim 6, wherein one of the protective layers includes an additional functional feature.

11. The method of claim 6, wherein prior to said loading step, the method further includes the step of:
    applying a uniformly thin layer of hot melt adhesive (HMA) on to the inner protective layer.

12. The method of claim 11, wherein the HMA is applied as a liquid layer or a formed solid layer.

13. The method of claim 12, wherein the applied HMA is spin coated when the HMA is a liquid.

14. The method of claim 13, wherein the spin coated HMA is dried to form the lens-contacting surface.

15. The method of claim 12, wherein an optical dye is added to the liquid, wherein the optical dye is selected from the group consisting of a cosmetic dye, a tinting dye, a photochromic dye and combinations thereof.

16. The method of claim 11, wherein the thickness of HMA is between 1 micron to 100 micron.

17. The method of claim 11, wherein the HMA is selected from the group consisting of polyurethane based materials, poly(oxazoline), poly(vinylpyrolidone/vinyl acetate), acrylic/styrenic copolymer emulsion, and polyvinyl resin with hydroxyl, carboxyl functionality.

18. The method of claim 11, wherein the HMA is selected from the group consisting of crosslinkable polyurethane materials, poly(oxazoline), poly(vinylpyrolidone/vinyl acetate), acrylic/styrenic copolymer emulsion, and polyvinyl resin with hydroxyl, carboxyl functionality.

19. The method of claim 11, wherein the HMA is tacky free at room temperature (20° C.) and is tacky at a temperature between 50° C. to 130° C.

20. The method of claim 1, wherein the closing step comprises tackifying a dry HMA by heating the dry HMA to a temperature in the range of 248 degrees F. to 284 degrees F. for a period of time between 1 minute and 2 minutes until the HMA sets.

21. The method of claim 1, wherein said closing step includes thermoforming the film to replicate the shape of the lens.

22. The method of claim 16, wherein the secondary clamp force is in the range from about 1% to about 50% of the primary clamp force.

23. The method of claim 1, wherein following said closing step, the method further including the step of:
    ejecting the lens from the mold after an HMA has set and the laminated lens is capable of withstanding ejection forces without deforming.

24. The method of claim 1 wherein the thermoplastic resin is selected from the group consisting of polymethyl(meth) acrylate, polycarbonate, polycarbonate/polyester blends, polyamide, polyester, cyclic olefin copolymers, polyurethane, polysulfone and combinations thereof.

25. The method of claim 1, wherein the thermoplastic resin is polycarbonate.

26. The method of claim 1, wherein the lens-forming cavity is selected from an afocal lens forming cavity, a unifocal lens forming cavity, a bifocal lens forming cavity, a trifocal lens forming cavity, and a progressive lens forming cavity.

\* \* \* \* \*